United States Patent [19]

Heuberger

[11] 4,444,365
[45] Apr. 24, 1984

[54] DOUBLE CAM MOUNTING ASSEMBLY FOR MOUNTING AN AIRCRAFT WING TO A FUSELAGE TO PROVIDE AN ADJUSTABLE ANGLE OF ATTACK

[75] Inventor: Lawrence K. Heuberger, Reno, Nev.

[73] Assignee: Omac, Inc., Reno, Nev.

[21] Appl. No.: 324,894

[22] Filed: Nov. 25, 1981

[51] Int. Cl.³ .......................... B64C 3/38; B64C 1/26; F16D 1/12
[52] U.S. Cl. .............................. 244/48; 403/DIG. 7; 403/408; 403/365; 411/273; 244/131
[58] Field of Search ........................ 244/38, 46, 48, 49, 244/129.1, 131, 45 R; 411/272, 273; 403/DIG. 7, 4, 161, 162, 365, 408

[56] References Cited

U.S. PATENT DOCUMENTS 1,769,005  7/1930  Van Dusen ...................... 244/129.1
1,949,787  3/1934  Dugan ................................. 244/48

FOREIGN PATENT DOCUMENTS 478369  1/1938  United Kingdom ................ 411/273

Primary Examiner—Galen L. Barefoot
Assistant Examiner—Rodney Corl
Attorney, Agent, or Firm—Sughrue, Mion, Zinn, Macpeak, and Seas

[57] ABSTRACT

Bracket members secured respectively to the end of the wing at a forward or aft location, and to the aircraft fuselage form with a clevis pin a clevis connection with the clevis pin projecting through the bracket members. The pin bears integrally a first cam fitted within a circular opening of one bracket member. A pair of cam bushings rotatably mounted on the clevis pin to the side of the first cam are positioned within circular openings of dual ribs of the other bracket member forming the clevis connection. The cam bushings and the clevis pin are independently rotated to vary the angle of attack of the wing mounted to the fuselage and are locked at adjusted positions.

4 Claims, 5 Drawing Figures

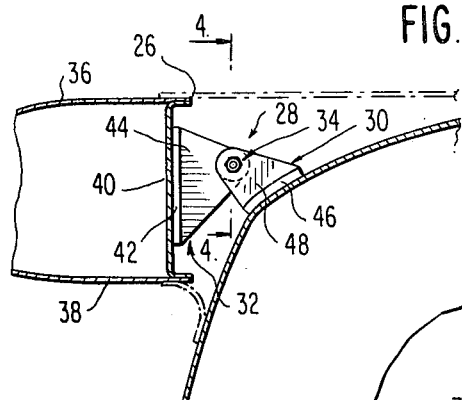
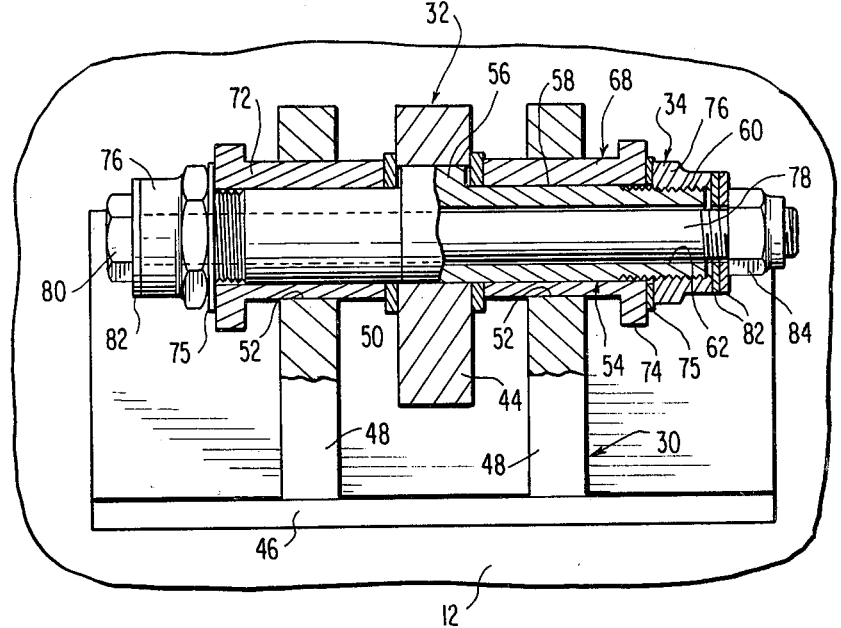
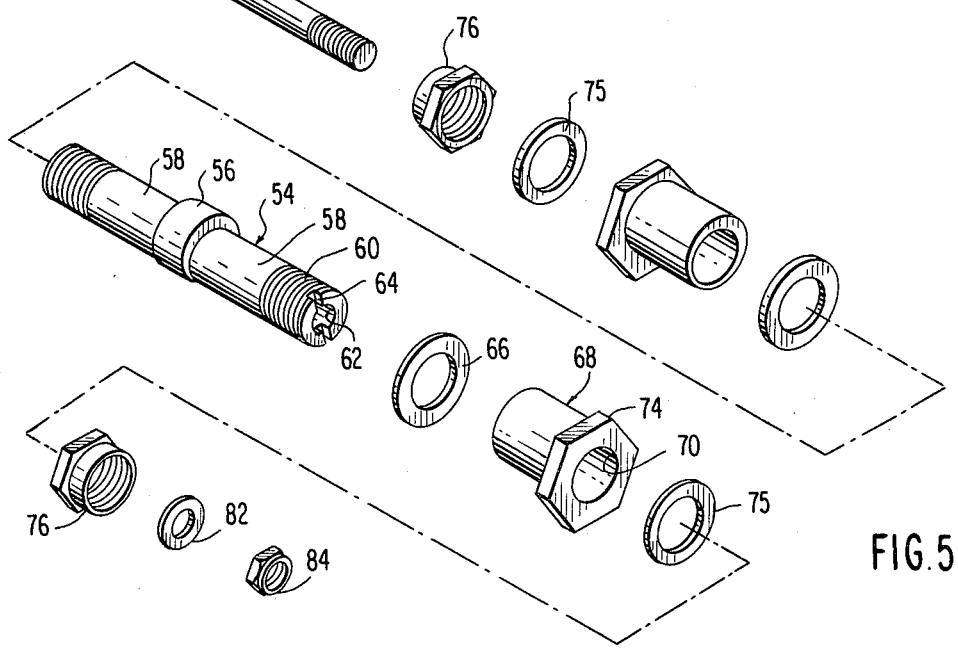

DOUBLE CAM MOUNTING ASSEMBLY FOR MOUNTING AN AIRCRAFT WING TO A FUSELAGE TO PROVIDE AN ADJUSTABLE ANGLE OF ATTACK

FIELD OF THE INVENTION

This invention relates to the mounting of wings or like members of airfoil configuration to the fuselage of an aircraft, and more particularly, to a mounting arrangement permitting some limited adjustment in the angle of attack of such airfoil structures.

BACKGROUND OF THE INVENTION

In the typical construction of light aircraft either for pleasure or business use, it is conventional to bolt or otherwise removably mount wings or horizontal stabilizers of airfoil configuration to the body or fuselage of the aircraft. This permits the wings to be manufactured separate from the aircraft and assembled thereto and facilitates the repair and/or maintenance of the aircraft after assembly. In order to facilitate such mounting, the fuselage in the area where the wind or like airfoil element is mounted, is provided brackets or like means having flanges projecting outwardly from the aircraft body. Complementary brackets bearing projections such as flanges are carried by the wing itself at given forward and aft locations. The projecting members of the brackets both wing borne and fuselage borne bear correspondingly sized openings through which bolts or like members project permitting the mechanical bolting and thus locking of the wing to the aircraft fuselage. Typically, a clevis type connection is formed wherein one of the brackets bears a single projection at right angles to the base, while the other bracket bears a pair of laterally spaced projections common to the base and projecting outwardly therefrom and to each side of the single projection borne by the clevis bracket of the other member forming the clevis connection. A bolt or clevis pin projects through aligned holes within the projections to complete the clevis connection.

While such an arrangement permits the ready assembly and disassembly of a wing or other airfoil type structure to the aircraft body, the elements forming the connection must be precisely sized, must be located precisely on the wing and aircraft fuselage, and the assembly requires close tolerance of all parts and permits no adjustment in the angle of attack of the airfoil itself.

It is, therefore, an object of the present invention to provide an improved, mounting assembly for removably mounting an aircraft wing or the like airfoil to an aircraft fuselage which allows for minor imprecise sizing of the mounting members provided to the fuselage and the wing and which readily permits limited adjustment in the angle of attack of the airfoil.

It is a further object of the present invention to provide an improved double cam mounting assembly for mounting of a wing or like airfoil to an aircraft fuselage wherein the angle of attack of the airfoil may be readily varied without accompanying angulation of the longitudinal axis of the airfoil to the fuselage.

SUMMARY OF THE INVENTION

The present invention is directed to a double cam mounting assembly for mounting an aircraft wing to an aircraft fuselage to permit limited adjustment in the angle of attack of the wing. The wing is cantilever mounted at one end to the side of the aircraft fuselage and is bolted at forward and aft locations along the confronting side of the fuselage. The improvement resides in first and second bracket members mounted respectively to the wing and the fuselage at either forward or aft wing locations and having projections projecting outwardly from the base of the bracket members and overlapping in side-by-side fashion. Circular holes are provided within respective projections. A pin projects longitudinally through the holes of the projections of the bracket members. First cam means is carried by the pin and disposed within the hole of one of the bracket members and second cam means adjustably carried by the pin and interposed within the holes of the other bracket member. Means are provided for independently angularly adjusting the pin and the second cam means. Means are further provided for locking the first and second cam means in angularly adjusted positions, whereby the angle of attack for the wing may be readily varied by adjustment of one or both of the cam means.

The first cam means may be integral with the pin and the second cam means may comprise rotatable bushings carried by the pin to the side of the integral first cam means. The pin may be threaded over a portion of the length which bears a lock nut for locking the cam bushings in angularly adjustable position. The pin may carry internally, a threaded bolt bearing a nut on one end for locking the pin against the lock nuts after angular adjustment of the pin itself relative to the cam bushings to prevent rotation of the pin relative to cam bushings on the pin.

BRIEF DESCRIPTION OF THE DRAWINGS

FIG. 3 is an enlarged, vertical elevation of the double cam mounting assembly forming a preferred embodiment of the present invention.

FIG. 4 is a cross-sectional view taken along line 4—4 of FIG. 3.

FIG. 5 is an exploded view of the clevis pin components forming a part of the assembly of FIGS. 3 and 4.

DESCRIPTION OF THE PREFERRED EMBODIMENT

Figure 1:
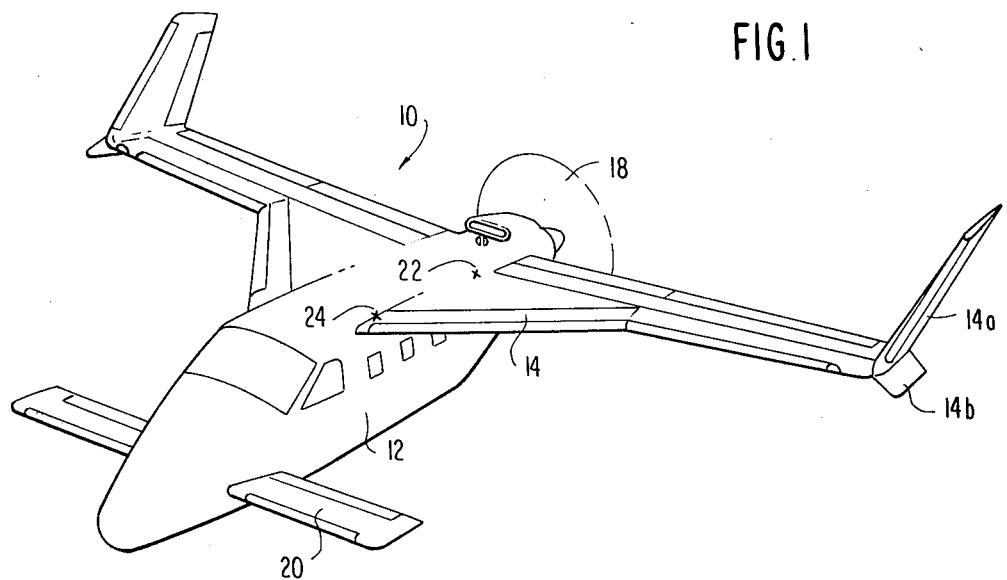
FIG. 1 is a perspective view of an aircraft incorporating the present invention.

Referring to the drawings, there is shown in FIG. 1 a pusher type, delta wing canard aircraft employing the double cam mounting assembly for mounting one end of the delta wing to the aircraft fuselage. The aircraft, indicated generally at 10, comprises an elongated normally horizontal streamlined fuselage 12. Attached to the fuselage 12 at the top and extending outwardly therefrom are paired delta wings 14 to respective sides of the aircraft. The wings 14 terminate at their outer ends in upper and lower winglets 14a, 14b respectively. The aircraft 10 is highly sophisticated and is propeller driven by way of propeller 18 through a jet prop power plant or engine which is mounted to the rear of the fuselage. At the forward end of the aircraft, there are provided a pair of canards 20 to respective sides of the aircraft which act in conjunction with the wings 14 to provide vertical lift to the aircraft.

As may be appreciated, the inner ends of delta wings 14 are detachably attached to the fuselage at two locations: an aft location 22, for instance, and at a forward location 24 at edge 26 of the wing 14. The mounting locations 22, 24 are longitudinally spaced and are effective in fixedly mechanically locking the wings to the side of the fuselage such that the wings 14 are cantilever.

Figure 2:
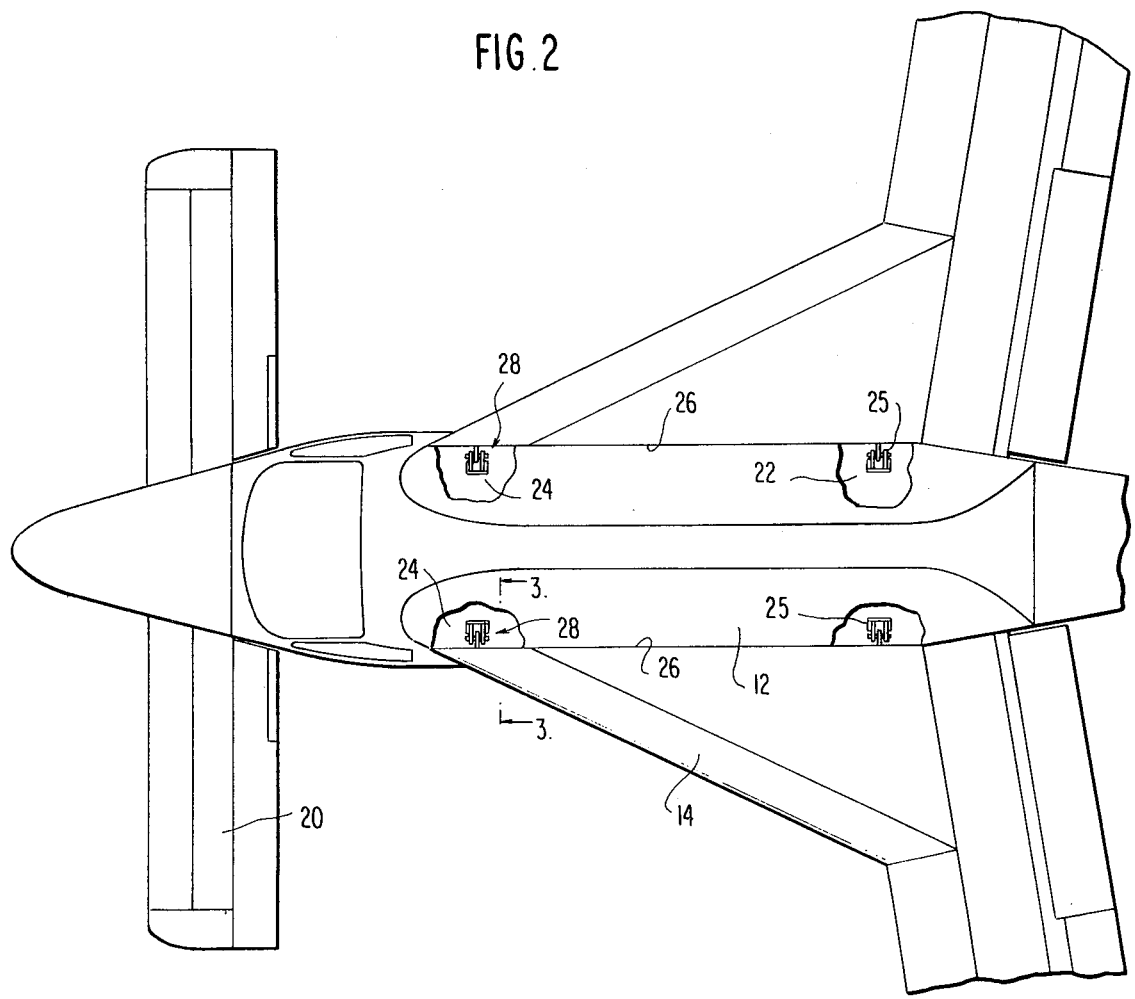
FIG. 2 is a top plan view of a portion of the pusher type, delta wing, canard aircraft illustrated in FIG. 4 employing the double cam mounting assembly of the present invention for mounting the forward end of the delta wings to the aircraft fuselage.

Instead of the wings 14 being mounted at a fixed angle of attack such that the mounting points 22, 24 are not only precisely located, but that the mechanisms for effecting that mounting are also extremely precise with high tolerance so as to insure a fixed but correct angle of attack to the wings 14, the present invention envisions that either at the fore or aft location 24, 22, the mounting of the wings 14 at this point permits a slight adjustment vertically to thus change the angle of attack of the airfoil delta wings 14. For illustrative purposes while a fixed mounting position is effected by a simple bolt and bracket connection 25 is effected at aft mounting locations 22 for each wing 14, a double cam mounting assembly indicated generally at 28, FIGS. 2 and 3, is provided at the forward wing mounting locations 24, to each side of the aircraft and function to adjustably connect the inboard end 26 of each wing to the aircraft fuselage 12 at that location. Each assembly 28 comprises three principal elements: a fuselage mounted bracket 30, a delta wing mounted bracket 32, and a clevis pin assembly indicated generally at 34, FIG. 3.

The delta wing 14 has some substantial thickness and consists of an internal framing assembly (not shown) bearing upper skin 36 and a lower skin 38 and extending outwardly from a vertical end wall 40 for the wing 14 which end wall is flanged at its upper and lower edges as at 40a with the flanges directed towards fuselage 12. The wing bracket 32 is welded or otherwise affixed by way of its base 42 to the vertical end wall 40 of wing 14 and bracket 32 is of inverted Tee configuration. That is, it includes a central right angle projection or flange 44 defining one element of a clevis type connection. Cooperating therewith is fuselage bracket 30 attached to the fuselage also by a weld, bolts, rivets or the like. The bracket 30 includes a base 46, and in this case, a pair of spaced right angle projections or flanges 48 projecting outwardly therefrom. Flange 44 and flanges 48 may be of triangular configuration and bear holes 50 and 52, respectively. It is through holes 50 and 52 that the clevis pin assembly 34 projects to provide the double cam mounting for wing 14 relative to fuselage 12 of the aircraft.

It should be noted that the opening or hole 50 within flange 44 of bracket 32 is of a smaller diameter than holes 52 within flanges 48 of bracket 30. This is immaterial. The holes may be of equal diameter. What is important is that there are in effect two different cam mechanisms working independently and at times, opposite each other to give maximum angle of attack adjustment to wing 14 relative to fuselage 12 to which it is mounted.

Referring to the detailed showing in FIGS. 4 and 5, the clevis pin assembly 34 is principally comprised of a cam pin indicated generally at 54 which may be of a length on the order of four inches or so in the illustrated embodiment. The cam pin at its center includes integrally eccentric 56 of circular configuration and sized to hole 50 of flange 44 forming the first of two cam means. It is further provided with smooth surface portions 58 to each side thereof over a given extent of its length and on the order of one inch or so. Eccentric 56 has a width approximately equal to one-half of one inch. The ends 60 of the cam pin are threaded on the outside thereof. Cam pin is further bored as at 62 throughout its length. Additionally, at least one end is provided with a slot 64 extending diametrically across the center of the same through a limited depth to permit a screwdriver or like tool to be inserted therein for rotation of the cam pin about its axis when projecting through the series of flanges 44, 48 of the assembly 28. To each side of the cam pin eccentric 56, when the same is mounted and centered within hole 50 of bracket 32, there is provided a flat washer as at 66. The inside diameter of washer 66 is in excess of the non-threaded portion 58 of cam pin 54. Slidably and rotatably mounted on each smooth surface portion 58 of the cam pin is a cam bushing indicated generally at 68. The bushings 68 are of a length slightly longer than the smooth surface portions 58 of the cam pin 54. Each bushing 68 is hollow and is provided with a bore 70 of a diameter slightly larger than the diameter of portion 58 of the cam pin 54. Each bushing 68 is provided with an eccentric as at 72 of circular configuration and sized to holes 52 and flange 48. Additionally one end terminates in an enlarged diameter portion 74 which is given a hexagonal exterior configuration, thus permitting it to be rotated by means of a wrench or the like applied thereto. The enlarged diameter portion 74 of and cam bushing is axially remote from the central eccentric 56 of the cam pin when the bushings are mounted on the smooth surface portions 58 of the cam pins, to each side of that bushing, with the cam bushings having a circular exterior configuration as is bore 70, but eccentric to that bore, thus forming cam portions 72. The cam bushing 68 are slid onto the smooth surface portions of the cam pins and because of the spacing between flanges 48, project within circular holes 52 of those flanges.

Further, flat washers 75 are mounted onto the threaded ends 60 of the cam pin, the flat washers 75 being dimensioned identically to washers 66 previously mounted to the cam pins and on the opposite end of the cam bushings 68. Hex lock nuts 76 having internal threads matching the exterior threads of the threaded ends 60 of cam pin 54 are threaded thereto and may be tightened down by a wrench applied to the hex surface of the lock nuts 76, so as to lock the eccentrics 72 forming the second cam means of assembly 36 at an appropriate angular position with respect to the eccentric 56 integral with cam pin 54.

The assembly is completed by a bolt 78, having an enlarged hexagonal head 80, and nut 84. The bolt 78 extends through bore 62 of the cam pin and bearing flat washers 82 at opposite ends. Further, a hex nut 84 is threaded to the end of bolt 78 and by relative compression between head 80 and nut 84, the elements making up the assembly are tightly gripped so as to lock the cam pin 54 with eccentric 56 defining first cam means, at a given angular position with respect to eccentrics 72 provided by the cam bushings 68 and defining second cam means. As may be appreciated, a portion of the vertical lift or drop provided to each wing 14 relative to fuselage 12 as between brackets 30 and 32, is caused by rotation of eccentric 56 from a position where it is aligned fore and aft between bracket bases 40, 46 to a position where it vertically overlies or underlies the axis of cam pin 54. The same is true for the dual eccentrics 72 forming the second cam means for the double cam assembly. This is, by rotation of the cam bushings 28 by applying a wrench to hex surface portions 74 of these bushings, the bushings may be rotated such that eccentrics 72 either overlie or underlie their horizontal axes and are centered within a vertical plane passing through the assembly and at the axis of cam 54 to effect maximum lift or drop of the forward end of wing 14. Maximum increase in angle of attack is achieved by eccentric 56 underlying the pin axis and eccentrics 72 overlying that axis. The minimum angle of attack occurs when eccentric 56 is rotated to the vertical top relative to the axis of the cam pin 54 and eccentrics 72 of the cam bushings 68 are rotated to their vertical bottoms. This effectively causes the wings 14 to drop at the front with its rear mounting point 22 fixed vertically with respect to the fuselage 12 to which it is mounted. The angle of attack for the wing 14 drops a distance to a degree determined by the relative cumulative height of eccentric 56 plus that of one of the eccentrics 72. By angular orientation of eccentrics 56, 72 the desired adjustment of angle of attack may be made for wing 19 without accompanying outboard end cocking of the wing longitudinally for or aft.

While the invention has been particularly shown and described with reference to a preferred embodiment thereof, it will be understood by those skilled in the art that various changes in form and details may be made therein without departing from the spirit and scope of the invention.

What is claimed is:

1. A double cam mounting assembly for mounting an aircraft wing to an aircraft fuselage to permit limited adjustment in the angle attack of the wing, said wing being cantilever mounted at its inboard end to the side of the aircraft fuselage at spaced forward and aft locations relative to the confronting side of the fuselage, the improvement wherein said double cam mounting assembly mounts said wing at one of said forward or aft wing locations and comprises:
   first and second bracket members mounted respectively to said wing and said fuselage and having projections projecting outwardly from the base of said bracket members at right angles to the longitudinal axis of the aircraft fuselage with said projections overlapping each other in side by side fashion,
   circular holes being provided within respective projections,
   a pin projecting longitudinally through the holes of said bracket members,
   first and second circular cam means carried by said pin, sized to and disposed within respective holes of said bracket members, and
   means for adjusting the angular position of said first and second cam means relative to each other to selectively raise and lower the aircraft wing at one of said aft and forward locations relative to the other of said locations and to thereby vary the angle attack for the wing,
   and wherein said first cam means comprises a first eccentric integral with said pin, and wherein said second cam means comprises a rotatable bushing carried by said pin to the side of said first cam means and bearing an eccentric,
   and wherein said assembly further comprises means for independently locking said first and second cam means at given angularly adjusted positions.

2. The double cam mounting assembly as claimed in claim 1, wherein said pin is threaded on the exterior surface thereof over a portion of its length to the side opposite said rotatable bushing from said integral eccentric, and wherein a lock nut is threaded to said threaded portion of said pin for locking the cam bushing in a selected angularly adjustable position with respect to said pin integral eccentric.

3. The double cam mounting assembly as claimed in claim 2, wherein said pin comprises an axial bore extending through the length thereof, and a bolt projecting through said bore and bearing a lock nut threaded to the end of the same such that tightening of said bolt compressively locks the axial array of members including the bushing on said pin to prevent relative rotation thereof and to insure a fixed angular relationship between said first and second cam means.

4. A double cam mounting assembly for mounting an aircraft wing to an aircraft fuselage to permit limited adjustment in the angle attack of said wing, said wing being cantilever mounted at one end to the side of the aircraft fuselage and being bolted at respectively spaced fore and aft locations along the confronting side of the fuselage, the improvement comprising:
   first and second bracket members mounted respectively to the wing and the fuselage at either a forward or aft bolt location,
   said first bracket member being of inverted Tee shape and including a base and a single, first projection projecting outwardly therefrom at right angles thereto,
   said second bracket member comprising a pair of spaced, second projections projecting outwardly from a base thereof and being positioned on opposite sides of the first projection borne by said first bracket member,
   circular holes provided within respective projections,
   a pin projecting longitudinally through the holes of the projections of said bracket members,
   a first eccentric of circular configuration provided integrally with said pin at the center thereof and being sized to and positioned within the circular hole of the projection of said first bracket member,
   rotatable cam bushing having bores slightly larger than the diameter of said pin to each side of said integral eccentric and being slidably mounted thereon to respective sides of said integral eccentric and said rotatable cam bushings having a circular periphery eccentric with respect to said bore means and forming second eccentrics and being of slightly smaller diameter than said holes within said second projections of said other bracket member and received thereby, said pin being threaded over a portion of its length at respective ends and threadably bearing lock nuts for locking the cam bushings in angularly adjustable positions with respect to said eccentric integral with said pin,
   and wherein said pin comprises an axial bore extending the length of the same and a threaded bolt extends through said bore and bears a lock nut on one end thereof for compressing the elements along said pin for insuring the locking of said first and second eccentrics at angularly adjusted positions determinative of a desired angle of attack for the wing with respect to the aircraft fuselage to which it is mounted.

* * * * *